(12) United States Patent
Zhang et al.

(10) Patent No.: US 10,384,887 B2
(45) Date of Patent: Aug. 20, 2019

(54) TRANSFER DEVICE WITH TWO TENSIONING WHEELS

(71) Applicants: HONGFUJIN PRECISION ELECTRONICS (CHENGDU) Co., Ltd., Chengdu (CN); HON HAI PRECISION INDUSTRY CO., LTD., New Taipei (TW)

(72) Inventors: Yi-Jian Zhang, Shenzhen (CN); Yong-Gang Hu, Shenzhen (CN)

(73) Assignees: HONGFUJIN PRECISION ELECTRONICS (CHENGDU) CO., LTD., Chengdu (CN); HON HAI PRECISION INDUSTRY CO., LTD., New Taipei (TW)

( * ) Notice: Subject to any disclaimer, the term of this patent is extended or adjusted under 35 U.S.C. 154(b) by 655 days.

(21) Appl. No.: 15/071,341

(22) Filed: Mar. 16, 2016

(65) Prior Publication Data
US 2016/0280470 A1    Sep. 29, 2016

(30) Foreign Application Priority Data
Mar. 24, 2015  (CN) .................... 2015 2 0167034 U

(51) Int. Cl.
*B65G 47/90*    (2006.01)
*B25J 9/04*    (2006.01)
*B65G 47/53*    (2006.01)

(52) U.S. Cl.
CPC ............ *B65G 47/902* (2013.01); *B25J 9/041* (2013.01); *B65G 47/53* (2013.01); *B65G 47/905* (2013.01)

(58) Field of Classification Search
CPC ..... B25J 9/04; B25J 9/041; B25J 9/045; B25J 9/046; B25J 9/047; B65G 47/902
See application file for complete search history.

(56) References Cited

U.S. PATENT DOCUMENTS

| | | | | |
|---|---|---|---|---|
| 4,398,863 A * | 8/1983 | Shum | ....................... | B25J 9/046 414/4 |
| 4,671,732 A * | 6/1987 | Gorman | .................... | B25J 9/046 414/735 |
| 5,051,055 A * | 9/1991 | Blatt | ........................ | B25J 18/02 414/626 |
| 2008/0253876 A1* | 10/2008 | Sandmeier | ............... | B25J 9/041 414/744.3 |
| 2010/0290886 A1* | 11/2010 | Hashimoto | .............. | B25J 9/042 414/800 |
| 2011/0182702 A1* | 7/2011 | Hashimoto | .............. | B25J 9/041 414/222.07 |
| 2012/0034058 A1* | 2/2012 | Jin | ........................... | B25J 9/041 414/591 |
| 2013/0297071 A1* | 11/2013 | Hediger | ................ | B25J 13/089 700/258 |

* cited by examiner

*Primary Examiner* — Gerald McClain
(74) *Attorney, Agent, or Firm* — ScienBiziP, P.C.

(57) ABSTRACT

A transfer device configured to transfer a workpiece includes a rotary table, a fixing seat, and a supporting member. The rotary table is capable of rotating a predetermined angle. The fixing seat is mounted on the rotary table. The supporting member is slidably mounted on the fixing seat and configured to support the workpiece. The supporting member raises or lowers the workpiece when sliding on the fixing seat, and the supporting member rotates with the rotary table.

17 Claims, 4 Drawing Sheets

TRANSFER DEVICE WITH TWO TENSIONING WHEELS

FIELD

The subject matter herein generally relates a transfer device, and more particularly to a transfer device which can transfer workpieces.

BACKGROUND

Conveyors comprising endless conveyor belts have long been used for transporting workpieces. There is often a need to transport workpieces from a first direction to a second direction, where the first direction and the second direction are not longitudinally extending from on another. Specialized turning belt conveyors are used to convey workpieces along different directions. However, the turning belt conveyors are adapted to workpiece having a small size.

BRIEF DESCRIPTION OF THE DRAWINGS

Implementations of the present technology will now be described, by way of example only, with reference to the attached figures.

DETAILED DESCRIPTION

Figure 1:
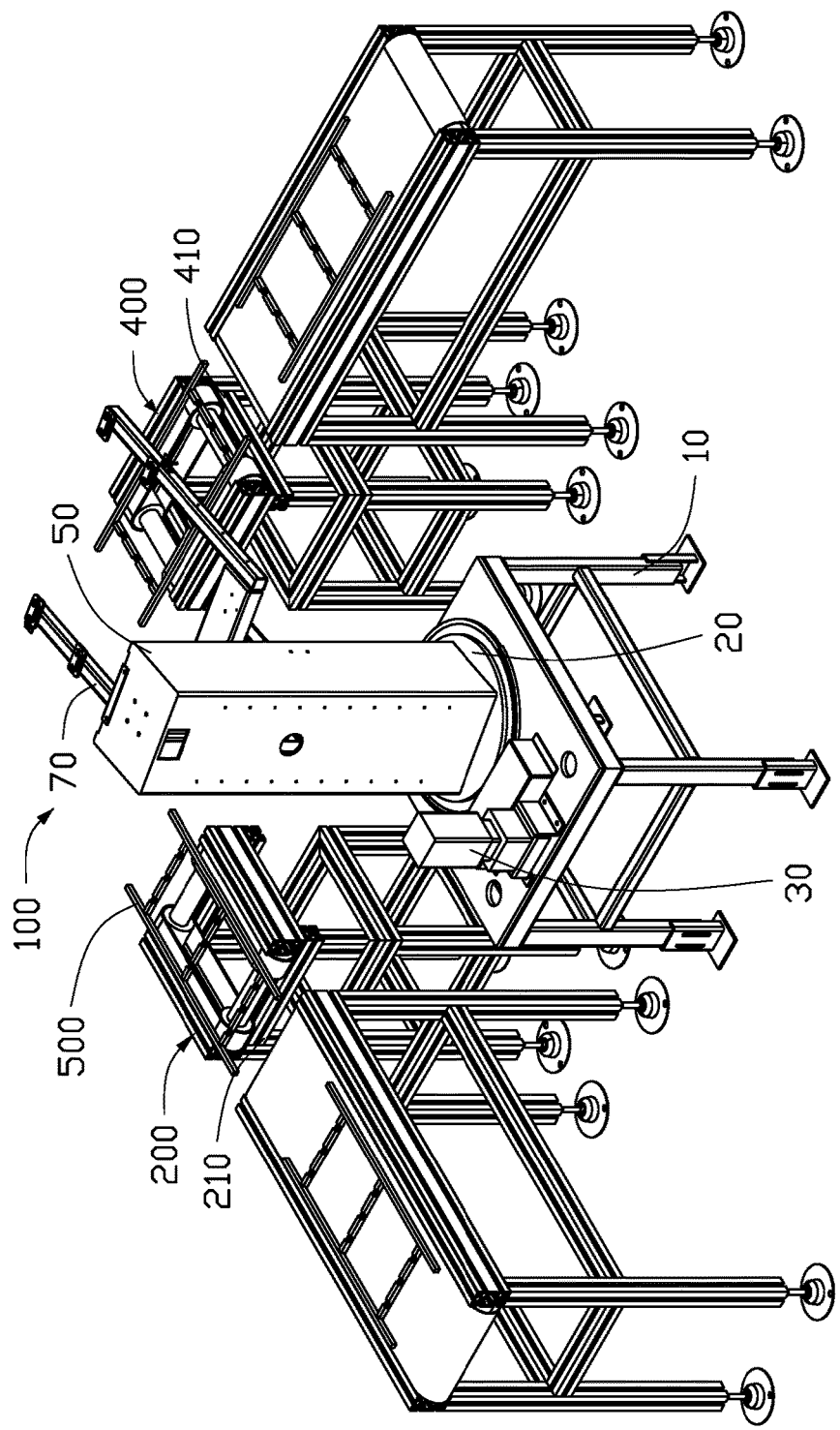
FIG. 1 is an isometric view of one embodiment of a transfer device, the transfer device is positioned between two conveyors.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as coupled, whether directly or indirectly through intervening components, and is not necessarily limited to physical connections. The connection can be such that the objects are permanently coupled or releasably coupled. The term "comprising" when utilized, means "including, but not necessarily limited to"; it specifically indicates open-ended inclusion or membership in the so-described combination, group, series and the like.

The present disclosure is described in relation to a transfer device configured to convey workpieces between two conveyors.

FIG. 1 illustrates that a transfer device 100 is located near a first conveyor 200 and a second conveyor 400. The transfer device 100 can be used to transfer workpieces (not shown) from the first conveyor 200 to the second conveyor 400, and the first conveyor 200 and the second conveyor 400 can form a ninety degree angle. The first conveyor 200 can include a first conveyor portion 210, and the second conveyor 400 can include a second conveyor portion 410. The workpiece can be positioned on a rack shelf stack 500 and conveyed from the first conveyor portion 410 to the second conveyor portion 510.

The transfer device 100 can include a base 10, a rotary table 20, a drive motor 30, a fixing seat 50, and a supporting member 70. The rotary table 20 can be rotatably mounted on the base 10, and the drive motor 30 can be mounted on the base 10 and configured to drive the rotary table 20 to rotate. The rotary table 20 can rotate a predetermined angle to rotate the workpiece coupled to the rotary table 20. The fixing seat 50 can be fixed to a surface of the base 10.

Figure 2:
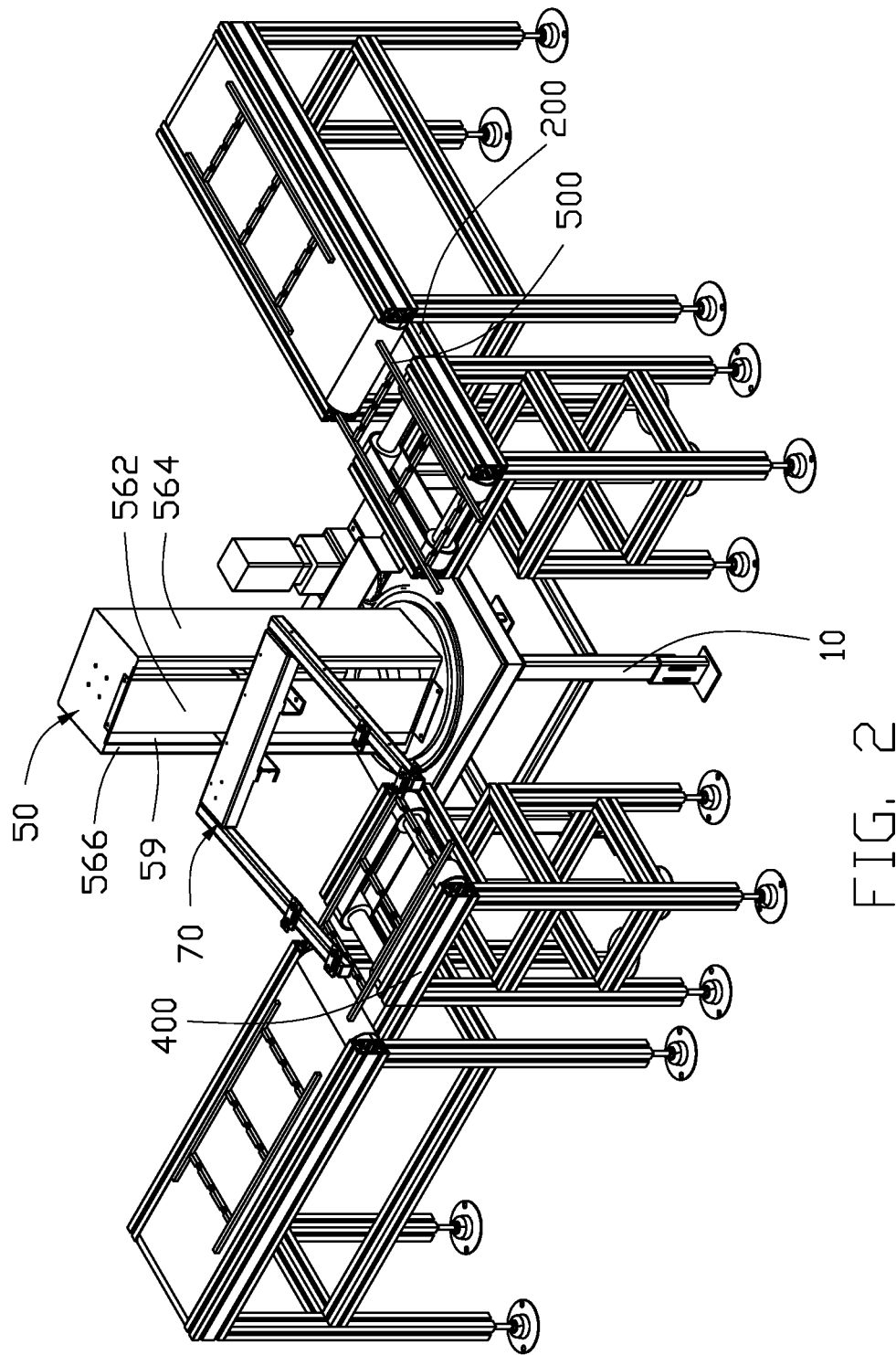
FIG. 2 is similar to FIG. 1, but viewed from another angle.

FIG. 2 illustrates that the supporting member 70 can be slidably mounted on the fixing seat 50. The supporting member 70 can be configured to support the workpiece. When the supporting member 70 moves along the fixing seat 50, the workpiece can be raised or lowered by the supporting member 70.

Figure 3:
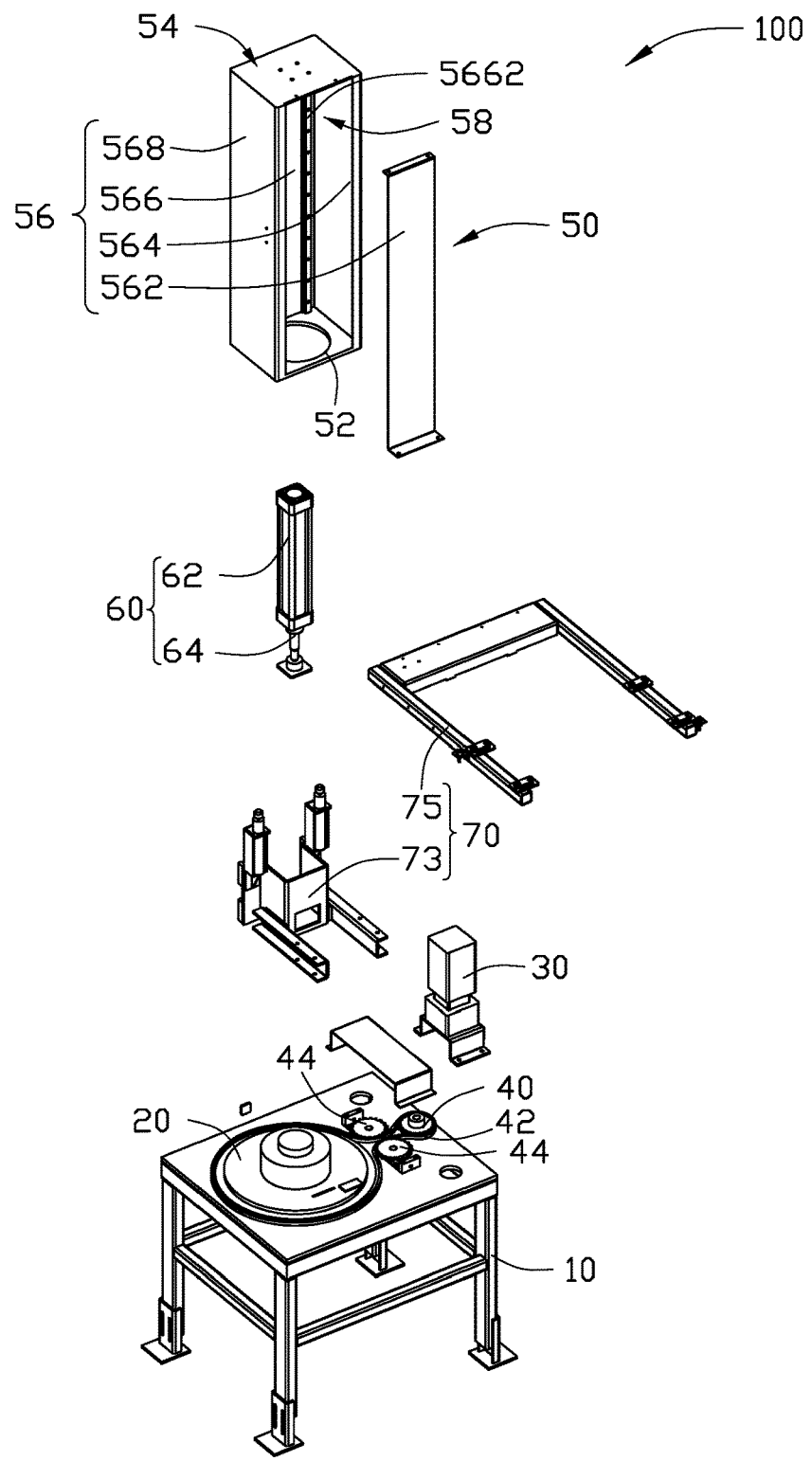
FIG. 3 is an exploded, isometric view of the transfer device shown in FIG. 1.

FIG. 3 illustrates that the drive motor 30 can be coupled to the rotary table 20 by a chain wheel 40 and a chain 42. The chain wheel 40 can be coupled to the drive motor 30. The chain wheel 40 can be mounted on the bracket 10, and the chain 42 can be wound on the chain wheel 40 and rotary table 20, thus the rotary table 20 can be rotated when driven by the drive motor 30. There can be two tensioning wheels 44 mounted on the bracket 10 and spaced from each other. The two tensioning wheels 44 can be mounted between the chain wheel 40 and the rotary table 20, and the two tensioning wheels 44 can be meshed with the chain 42, thus the chain 42 would not loose during working.

The fixing seat 50 can include a bottom plate 52, a top plate 54, and a side plate 56 coupled between the bottom plate 52 and the top plate 54. The bottom plate 52, the top plate 54, and the side plate 56 can be cooperatively form a receiving space 58. The bottom plate 52 can be fixedly mounted on the rotary table 20. The side plate 56 can include a first side plate 562, a second side plate 564, a third side plate 566, and a fourth side plate 568. The first side plate 562 can be positioned opposite to the third side plate 566, and the second side plate 564 can be positioned opposite to the fourth side plate 568. A width of the first side plate 562 can be smaller than a distance between the second side plate 564 and the fourth side plate 568, thus two openings 59 (shown in FIG. 2) can be formed at two sides of the first side plate 562. The two openings 59 can be in communication with the receiving space 58. A surface of the third side plate 566 toward the first side plate 562 can include two parallel guide rails 5662.

The transfer device 100 can further include a driving member 60 configured to drive the supporting member 70 to move along the guide rails 5662 of the fixing seat 50. The driving member 60 can be received and mounted in the receiving space 58. The driving member 60 can include a drive portion 62 and a drive shaft 64 protruded out of the drive portion 62. The drive portion 62 can be mounted on a surface of the top plate 54 toward the bottom plate 52. In at least one embodiment, the driving member 60 can be a cylinder. The supporting member 70 can include a mounting frame 73 and a supporting frame 75 coupled to the mounting frame 73.

Figure 4:
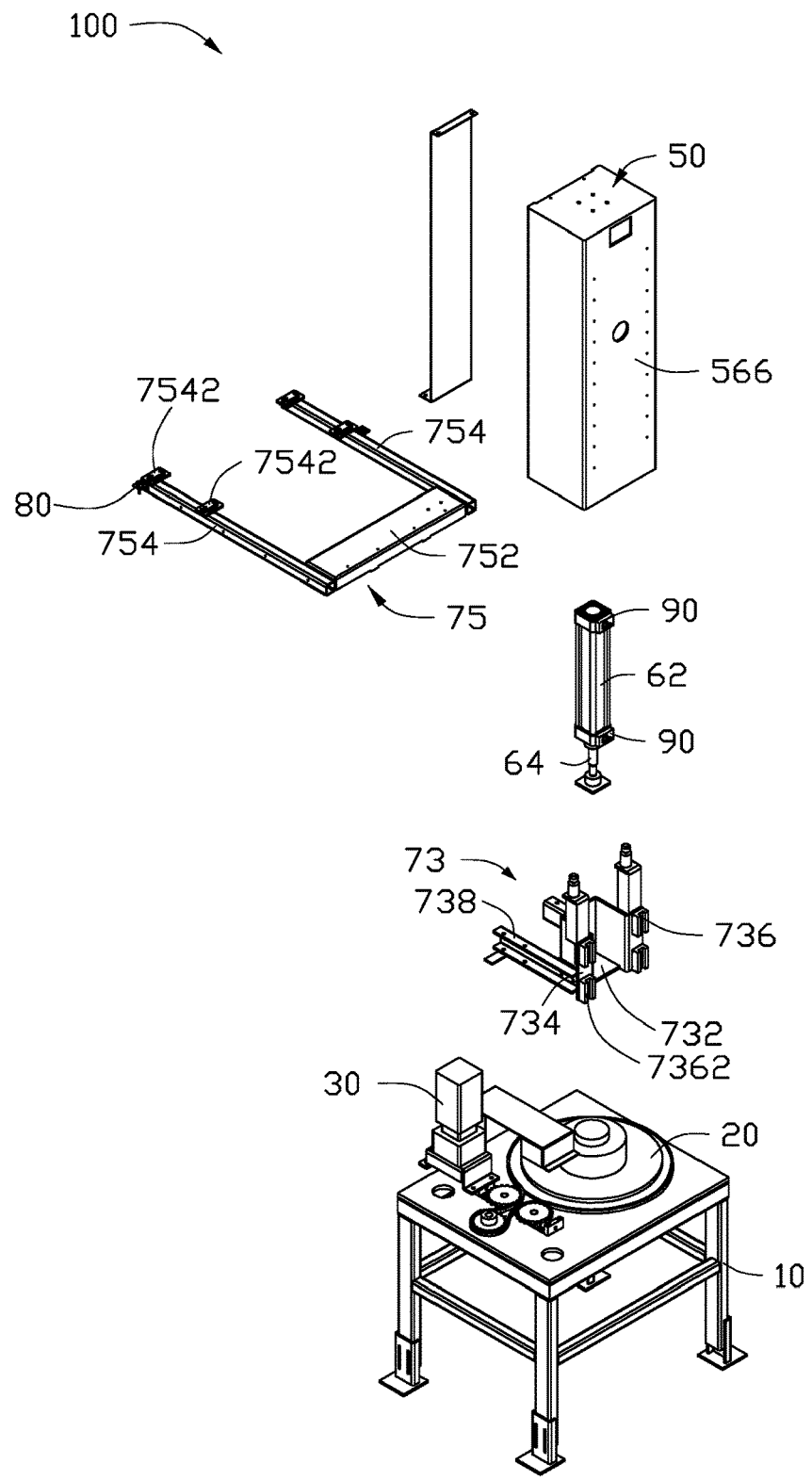
FIG. 4 is similar to FIG. 3, but viewed from another angle.

FIG. 4 illustrates that the mounting frame 73 can include a main body 732, a side wall 734, and at least one mounting portion 738. The main body 732 can be coupled to the drive shaft 64, and the side wall 734 can vertically extend from edges of the main body 732. The side walls 734 can include two sliding blocks 736, and the sliding blocks 736 can be positioned corresponding to the guide rails 5662. Each of the sliding blocks 736 can define a slide groove 7362. The guide rails 5662 can be coupled to the slide grooves 7362, thus the mounting frame 73 can slide along the fixing seat 50. In at least one embodiment, there are two mounting portions 738, and the two mounting portions 738 can be mounted at two sides of the side wall 734. Each mounting portion 738 can extend from one end of the side wall 734 adjacent to the main body 732 and away from the sliding blocks 736, and the two mounting portions 738 can protrude out of the receiving space 58 from the openings 59.

The supporting frame 75 can be configured to support the workpieces. In at least one embodiment, the supporting frame 75 can be substantially U-shaped and include a connecting portion 752 and two arms 754. The connecting portion 752 can be coupled to the two ends of the two mounting portions 738 away from the side wall 734. The two arms 754 can be coupled to two sides of the connecting portion 752 and extend along a direction away from the fixing seat 50. One end of each arm 754 away from the fixing seat 50 can include two fixing blocks 7542 configured to limit the movement of the workpiece. Each arm 754 can further include a proximity switch 80 configured to feedback a signal that the workpiece is clamped by the arm 754. The proximity switch 80 can be mounted on one end of the arm 754 away from the fixing seat 50 and adjacent to the fixing block 7542.

The transfer device 100 can further include a plurality of magnetic switches 90. In at least one embodiment, the magnetic switches 90 can be mounted on the drive portion 62 and spaced from each other. The magnetic switches 90 can be configured to control a rotation angle of the rotary table 20 and a sliding distance of the supporting member 70.

In assembling the transfer device 100, the rotary table 20 and the drive motor 30 can be mounted on the bracket 10 and spaced from each other, and the rotary table 20 and the drive motor 30 can be coupled by the chain 42. Then, the fixing seat 50 can be fixed on the rotary table 20 and would not rotate relative to the rotary table 20. The driving member 60 can be fixed on the top plate 54 of the fixing seat 50, and the mounting frame 73 can be coupled to the driving member 60. After that, the supporting frame 75 can be coupled to the mounting frame 73.

In operation, the transfer device 100 can be positioned between the first conveyor 200 and the second conveyor 400, and the first conveyor 200 and the second conveyor 400 can form a ninety degree angle. In an initial state, the two arms 754 can be positioned at two sides of the first conveyor 200 and below the first conveyor portion 210. The workpiece and the rack shelf stack 500 can be conveyed by the first conveyor 200, and the proximity switch 80 can sense the workpiece. The driving member 60 can drive the supporting frame 75 to slide away from the rotary table 20, the fixing blocks 7542 can be positioned at two sides of the rack shelf stack 500 to prevent the rack shelf stack 500 from moving relative to the supporter 70. The rack shelf stack 500 and the workpiece positioned on the rack shelf stack 500 can be raised up as the driving member 60 drives the supporting frame 75. Then, the rotary table 20 can rotate a predetermined angle driven by the drive motor 30 and move to a position above the second conveyor 400. At this time, the driving member 60 can drive the supporting frame 75 to move toward the rotary table 20, and the workpiece and the rack shelf stack 500 can be lowered and positioned on the second conveyor portion 410 of the second conveyor 400. After that, the rotary table 20 can rotate the predetermined angle driven by the drive motor 30, and the supporting member 70 can move to a position below the first conveyor portion 210.

The transfer device 100 can raise and rotate the workpiece, and the transfer device 100 has a small size and adapted for small working space. As the supporting member 70 can be configured to support the workpiece, so the workpiece has a large size can be transferred by the transfer device 100.

In other embodiments, the transfer device 100 can be used to convey workpieces between two conveyors forming any other angles.

In other embodiments, the bracket 10 can be omitted, and the rotary table 20 can be rotatably mounted on a worktable.

In other embodiments, the two tensioning wheels can be omitted, and the chain 42 can be wound on periphery of the chain wheel 40 and the rotary table 20.

In other embodiments, the first side plate 562, the second side plate 564, and the fourth side plate 568 can be omitted, and the drive portion 62 can be fixed at the bottom plate 52 or the side plate 56.

In other embodiments, the mounting bracket 73 can be omitted, and the supporting bracket 75 can be coupled to the drive shaft 64 of the driving member 60.

The embodiments shown and described above are only examples. Many details are often found in the art such as the other features of a transfer device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including, the full extent established by the broad general meaning of the terms used in the claims. It will therefore be appreciated that the embodiments described above may be modified within the scope of the claims.

What is claimed is:

1. A transfer device configured to transfer a workpiece, the transfer device comprising:
   a bracket;
   a rotary table mounted on the bracket and capable of rotating through a predetermined angle;
   a fixing seat mounted on the rotary table; and
   a supporting member slidably mounted on the fixing seat and configured to support the workpiece;
   a drive motor mounted on the bracket and spaced from the rotary table;
   a chain wheel coupled to the drive motor;
   a chain wound on the chain wheel and the rotary table; and
   two tensioning wheels mounted on the bracket between the chain wheel and the rotary table, the two tensioning wheels being distanced from the drive motor, the two tensioning wheels opposing each other and both being geared into an outer side of the chain;
   wherein the supporting member, when moving along the fixing seat, raises or lowers the workpiece, and the supporting member rotates with the rotary table.

2. The transfer device as claimed in claim 1,
wherein the fixing seat comprises a bottom plate mounted on the rotary table, a top plate, and a side plate positioned between the bottom plate and the top plate; and
wherein the transfer device further comprises a driving member mounted on the top plate, and the supporting member is coupled to the driving member.

3. The transfer device as claimed in claim 2, wherein the transfer device further comprises two magnetic switches mounted on the driving member and spaced from each other, one of the two magnetic switches is configured to control a rotation angle of the rotary table, and an other of the two magnetic switches is configured to control a sliding distance of the supporting member.

4. The transfer device as claimed in claim 2, wherein the driving member comprises a drive portion and a drive shaft protruding out of the drive portion, the drive portion is coupled to the top plate, and the drive shaft is coupled to the supporting member.

5. The transfer device as claimed in claim 2, wherein the supporting member comprises a mounting frame and a supporting frame, and the supporting frame and the driving member are connected by the mounting frame.

6. The transfer device as claimed in claim 5,
wherein a surface of the side plate toward the supporting member comprises two parallel guide rails, and the mounting frame comprises two sliding blocks corresponding to the two guide rails; and
wherein each of the two sliding blocks defines a slide groove, and the slide grooves of the two sliding blocks are slidably coupled to the sliding rails.

7. The transfer device as claimed in claim 5, wherein the supporting frame comprises a connecting portion and two arms, the connecting portion is coupled to the mounting frame, and the two arms are mounted at two sides of the connecting portion and extend away from the fixing seat.

8. The transfer device as claimed in claim 7, wherein each of the two arms comprises two fixing blocks, the two fixing blocks are positioned at one end of the arm away from the connecting portion.

9. The transfer device as claimed in claim 7, wherein each of the two arms further comprises a proximity switch configured to feedback a signal that the workpiece is clamped by the arms.

10. A transfer device configured to transfer a workpiece, the transfer device comprising:
a bracket;
a rotary table mounted on the bracket and capable of rotating through a predetermined angle;
a fixing seat mounted on the rotary table; and
a supporting member slidably mounted on the fixing seat and configured to support the workpiece;
a drive motor mounted on the bracket and spaced from the rotary table;
a chain wheel coupled to the drive motor;
a chain wound on the chain wheel and the rotary table;
two tensioning wheels mounted on the bracket between the chain wheel and the rotary table, the two tensioning wheels being distanced from the drive motor, the two tensioning wheels opposing each other and both being geared into an outer side of the chain; and
a driving member mounted on the fixing seat and comprising a drive portion and a drive shaft protruding out of the drive portion, the drive shaft being coupled to the supporting member and configured for moving along the fixing seat;
wherein the supporting member, when moving along the fixing seat, raises or lowers the workpiece, and the supporting member rotates with the rotary table.

11. The transfer device as claimed in claim 10,
wherein the fixing seat comprises a bottom plate mounted on the rotary table, a top plate, and a side plate positioned between the bottom plate and the top plate; and
wherein the drive portion is coupled to the top plate, and the drive shaft is coupled to the supporting member.

12. The transfer device as claimed in claim 11, wherein the transfer device further comprises two magnetic switches mounted on the driving member and spaced from each other, one of the two magnetic switches is configured to control a rotation angle of the rotary table, and the other of the two magnetic switches is configured to control a sliding distance of the supporting member.

13. The transfer device as claimed in claim 12, wherein the supporting member comprises a mounting frame and a supporting frame, and the supporting frame and the driving member are connected by the mounting frame.

14. The transfer device as claimed in claim 13,
wherein a surface of the side plate toward the supporting member comprises two parallel guide rails, and the mounting frame comprises two sliding blocks corresponding to the two guide rails; and
wherein each of the two sliding blocks defines a slide groove, and the slide grooves of the two sliding blocks are slidably coupled to the sliding rails.

15. The transfer device as claimed in claim 14, wherein the supporting frame comprises a connecting portion and two arms, the connecting portion is coupled to the mounting frame, and the two arms are mounted at two sides of the connecting portion and extend away from the fixing seat.

16. The transfer device as claimed in claim 15, wherein each of the two arms comprises two fixing blocks, the two fixing blocks are positioned at one end of the arm away from the connecting portion.

17. The transfer device as claimed in claim 15, wherein each of the two arms further comprises a proximity switch configured to feed back a signal when the workpiece is clamped by the arms.

\* \* \* \* \*